United States Patent
Atherton et al.

(10) Patent No.: US 6,961,794 B2
(45) Date of Patent: Nov. 1, 2005

(54) SYSTEM AND METHOD FOR ANALYZING AND OPTIMIZING COMPUTER SYSTEM PERFORMANCE UTILIZING OBSERVED TIME PERFORMANCE MEASURES

(75) Inventors: William Edward Atherton, Hillsborough, NC (US); Randal Lee Bertram, Raleigh, NC (US); Gregory Joseph McKnight, Chapel Hill, NC (US); William Joseph Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 09/957,912

(22) Filed: Sep. 21, 2001

(65) Prior Publication Data

US 2003/0061324 A1 Mar. 27, 2003

(51) Int. Cl.[7] ............................................... G06F 13/00
(52) U.S. Cl. ................................................... 710/301
(58) Field of Search ............................... 709/220, 221, 709/222, 223, 224, 200; 710/100, 300, 301, 104, 305, 306, 313, 15, 16, 17, 18, 19; 718/1, 100, 102, 105

(56) References Cited

U.S. PATENT DOCUMENTS

| | | |
|---|---|---|
| 4,905,171 A | 2/1990 | Kiel et al. |
| 5,784,616 A | 7/1998 | Horvitz |
| 5,802,593 A | 9/1998 | Grimsrud |
| 5,819,030 A | 10/1998 | Chen et al. |
| 5,838,948 A | 11/1998 | Bunza |
| 5,889,953 A * | 3/1999 | Thebaut et al. .............. 709/221 |
| 6,421,719 B1 * | 7/2002 | Lewis et al. ................. 709/224 |

OTHER PUBLICATIONS

Related Co-pending U.S. Appl. No. 09/253,413, filed Feb. 19, 1999, Randal L. Bertram, et al.
Related Co-pending U.S. Appl. No. 09/918,330, filed Jul. 30, 2001, Randall L. Betram, et al.
Related Co-pending U.S. Appl. No. 09/283,362, filed Mar. 31, 1999, Randal L. Bertram, et al.
Related Co-pending U.S. Appl. No. 09/255,955, filed Feb. 21, 1999, Randal L. Bertram et al.

* cited by examiner

Primary Examiner—Robert B. Harrell
(74) Attorney, Agent, or Firm—Martin J. McKinley; Dillon & Yudell LLP

(57) ABSTRACT

A data processing system and method analyze the performance of its components by obtaining measures of usage of the components over time as well as electrical requirements of those components to recommend an optimal configuration. The location in the system and the time duration that any one or more components is in a performance-limiting or bottleneck condition is determined. Based on the observed bottlenecks, their times of occurrence and their time duration, more optimal configurations of the system are recommended. The present invention is particularly adapted for use in data processing systems where a peripheral component interconnect (PCI) bus is used.

20 Claims, 10 Drawing Sheets

Performance Analysis Recommendations

System A Go to details
Bottleneck: Multiple LAN Adapters. To improve performance:
*First consider moving LAN adapter (Segment 0 currently in slot #1) to PCI slot #3 or move LAN adapter (Segment 1 currently in slot #2) to PCI slot #3 (Move only one adapter. Do not move both adapters).

*If additional performance is desired after migrating an adapter, then consider the following
1. Add faster LAN technology (adapters/switches) to LAN Segment 0 and LAN Segment 1
2. Add another LAN adapter, install into PCI slot #5, and migrate a subset of users from both LAN Segment 0 and 1 to the new LAN subnet.

*FIG. 6A*

Performance Analysis Recommendations

System B Go to details
Bottleneck: Multiple Disk Adapters. To improve performance:
*First consider moving disk adapter 0 currently in PCI slot 1 to PCI slot #3 <u>or</u> move disk adapter #1 currently in PCI slot 1 to PCI slot #3 (Move only one adapter. Do not move both adapters).

*If additional performance is desired after migrating an adapter, then consider the following:
1. Use faster disk drives or increase the number of disks in RAID physical drive #1 and physical drive #3
2. Add another disk controller and additional disk drives. Install the disk controller in PCI slot #5 and migrate some of your users and data files from physical disk drive #1 and #3 onto the new disk controller volume(s).

*FIG. 6B*

Performance Analysis Recommendations

System C Go to details
Bottleneck: Disk and LAN Adapter combination bottlenecks. To improve performance:
*First consider moving LAN adapter # 0 in PCI slot #1 to PCI slot #3 <u>or</u> move disk adapter 0 currently in PCI slot #2 to PCI slot #3 (Move only one adapter. Do not move both adapters). (We always recommend moving LAN adapter first as it is the easiest to move) When only one choice is available because only one slot is available to move one of the "hot" pairs, recommend moving <u>only</u> the LAN adapter.

*If additional performance is desired after migrating a adapter, then consider the following:
1. Use faster LAN technology (adapters/switches) for LAN Segment #0
2. Add another LAN adapter to PCI slot #5 and migrate users from LAN Segment #0 to the new LAN subnet.
3. Add faster disk drives or increase the number of disks in RAID physical drive #1
4. Add another disk controller and additional disk drives. Install the disk controller in PCI slot #6 and migrate some of your data files from physical drive #1 onto the new disk controller logical volume.

*FIG. 6C*

System A Details
Bottleneck: Multiple LAN Adapters. This bottleneck occurred 140 out of the 180 hours that this system was analyzed, or 78% of the time. It was observed between Mon 5 February 2001 EDT and Wed 14 February 2001 16:00 EDT.

To graph the constrained resources, click on:
*NDIS - Adapter 0 - Bytes Total/Second (constrained for 94% of the 26 hours of bottleneck time).

*NDIS - Adapter 1 - Bytes Total/Second (constrained for 98% of the 26 hours of bottleneck time).

To improve performance:
*First consider moving LAN adapter (Segment 0 currently in slot #1) to PCI slot #3 or move LAN adapter (Segment 1 currently in slot #2 to PCI slot #3 (Move only one adapter. Do not move both adapters).

*If additional performance is desired after migrating an adapter, then consider the following:
1. Add faster LAN technology (adapters/switches) to LAN Segment 0 and LAN Segment 1
2. Add another LAN adapter to PCI slot #5 and migrate a subset of users from both LAN Segment 0 and 1 to the new LAN subnet.

*FIG. 7A*

System B Details
The following bottlenecks occurred for a total of 110 out of 189 hours in the report, or 58% of the time.

Bottleneck: Multiple Disk Controllers. This bottleneck occurred 80 out of the 189 hours that this system was analyzed, or 42% of the time. It was observed between Mon 5 February 2001 EDT and Wed 14 February 2001 16:00 EDT.

To graph the constrained resources, click on:
*Disk 0: Utilization (constrained for 100% of the 80 hours of bottleneck time)
*Disk 1: Utilization (constrained for 100% of the 80 hours of bottleneck time)

To improve performance:
*First consider moving disk adapter 0 currently in PCI slot 1 to PCI slot #3 or move disk adapter #1 currently in PCI slot 1 to PCI slot #3 (Move only one adapter. Do not move both adapters).

*If additional performance is desired after migrating an adapter, then consider the following:
1. Use faster disk drives or increase the number of disks in RAID physical drive #1 and physical drive #3.
2. Add another disk controller and additional disk drives. Install the disk controller in PCI slot #5 and migrate some of your data files from physical disk drive #1 and #3 onto the new disk controller volume(s).

*FIG. 7B*

System C Details
The following bottlenecks occurred for a total of 110 out of 189 hours in the report, or 58% of the time.

Bottleneck: Disk. This bottleneck occurred 80 out of the 189 hours that this system was analyzed, or 42% of the time. It was observed between Mon 5 February 2001 EDT and Wed 14 February 2001 16:00 EDT.

Bottleneck: LAN Adapter. This bottleneck occurred 110 out of the 189 hours that this system was analyzed, or 58% of the time. It was observed between Mon 5 February 2001 EDT and Wed 14 February 2001 16:00 EDT.

To graph the constrained resources, click on:
*Disk 0: Utilization (constrained for 100% of the 80 hours of bottleneck time)
*NDIS - Adapter 0 - Bytes Total/Second (constrained for 94% of the 110 hours of bottleneck time).

To improve performance:
*First consider moving LAN adapter (Segment 0 currently installed in slot #1) to PCI slot #3 or move disk adapter 0 (currently installed in slot #2) to PCI slot #3 (Move only one adapter. Do not move both adapters).

*If additional performance is desired after migrating an adapter, then consider the following:
1. Add faster LAN technology (adapters/switches) to LAN Segment 0
2. Add another LAN adapter to PCI slot #5 and migrate a subset of users from LAN Segment 0 to the new LAN subnet.
3. Use faster disk drives or increase the number of disks in RAID physical drive #1 and physical drive #3
4. Add another disk controller and additional disk drives. Install the disk controller in PCI slot #6 and migrate some of your data files from physical disk drive #1 and #3 onto the new disk controller volume(s).
5. The disk controller for Disk Device 1 could also be causing a bottleneck. If this disk controller has a large number of disk drives attached, install another disk controller with additional disk drives.

*FIG. 7C*

SYSTEM AND METHOD FOR ANALYZING AND OPTIMIZING COMPUTER SYSTEM PERFORMANCE UTILIZING OBSERVED TIME PERFORMANCE MEASURES

CROSS REFERENCE TO RELATED APPLICATIONS

The present application is related to U.S. patent application Ser. No. 09/256,452 (now abandoned) "System and Method for Monitoring and Analyzing Computer System Performance and Making Recommendations for Improving It", filed on Feb. 23, 1999, assigned to the assignee of the present application and incorporated herein by reference.

The present application is related to U.S. patent application Ser. No. 09/918,330 (still pending), "System and Method for Identifying One or More Optimum Configurations of a Data Processing System" filed on Jul. 30, 2001, assigned to the assignee of the present application and incorporated herein by reference.

The present application is related to U.S. patent application Ser. No. 09/283,362 (now abandoned), "System and Method for Predicting Computer System Performance and for Making Recommendations for Improving Its Performance", Ser. No. 09/283,362, and Mar. 31, 1999 assigned to the assignee of the present application and incorporated herein by reference.

The present application is related to U.S. patent application Ser. No. 09/255,955 (now U.S. Pat. No. 6,434,613) "System and Method for Identifying Latent Computer System Bottlenecks and for Making Recommendations for Improving Computer System. Performance", Ser. No. 09/255,955, filed Feb. 23, 1999 assigned to the assignee of the present application and incorporated herein by reference.

BACKGROUND OF THE INVENTION

1. Technical Field

The present invention relates in general to data processing systems, and more particularly, to capacity management in data processing systems (such as a data transmission network or a server, alone or together with other components). Still more particularly, the present invention relates to a method and system for analyzing the performance of individual components of the data processing system.

2. Description of the Related Art

Managing a computer system which includes a plurality of devices such as networks or servers is of special interest to data processing (or information technology) personnel. The computer systems typically include a plurality of diverse devices such as memory, disks, local area network (LAN) adapters and central processing units (CPUs) which interact in various interrelated ways when a variety of data processing applications are used in the computer system.

Frequently, the performance of the computer system or network is less than it could be because one or more of the components is not appropriate for application loading of the computer system (or a network or server). It is desirable to know what changes to the computer system would be worthwhile in improving the capacity of the computer system and making those changes while avoiding changes which would not have a significant benefit to the performance of the computer system.

As the systems get larger and more complex, these interactions become hard to define, model or predict. Also, the relationships between the devices, and hence the capacity of the system becomes difficult to manage. These systems are quite expensive to install and changes to the system involve a significant investment. While an investment is desirable which will improve the performance of the computer system, some investments in improvements to the computer system would not be worthwhile since the performance of the overall system would not improve.

The peripheral component interconnect (PCI) specification introduced by Intel Corporation defines a high-performance local bus architecture that supports the installation of PCI-compliant expansion cards. The PCI standard has evolved over a period of years to support a wide assortment of system and hardware component capabilities. "Hardware components" are herein defined as any part of a data processing system and may include data storage devices, communication devices, etc. "Hardware adapters" are hardware components implemented on an adapter card installed on an expansion slot. Hardware adapters can usually be easily moved or replaced while other hardware components may be permanently coupled (soldered) to the data processing system.

Whereas the original PCI bus standard, herein referred to as "conventional mode," limits bus clock frequency either to 33 MHz or 66 MHz, newer PCI-X hardware adapters, operating in "PCI-X mode," are capable of bus communication at 66 MHz, 100 MHz or 133 MHz. Available PCI-compatible hardware adapters support either 32-bit wide and 64-bit wide versions of the PCI bus and operate at a variety of supply voltages (e.g., 3.3 V and 5V). Future expansions and revisions of the PCI architecture may include higher supported clock speeds, wider buses, or double-data rate modes of operation, which will result in an even wider array of possible system configurations.

Despite the wide array of implementations, compatibility has been maintained between devices implementing different versions of the PCI bus specification. For example, PCI buses are programmed to operate at the fastest common speed or mode that all hardware components on the bus can support. Hardware components restrict their speed or mode in the presence of buses or hardware components that are not capable of faster operation. In general, hardware components having different characteristics that are coupled to the same PCI bus function properly, but the performance of the faster hardware components is degraded due to the lower bus frequency dictated by the slower hardware components. "System performance" or "performance" is herein defined as the throughput of a data processing system or the total number of users the data processing system can currently support.

The performance of hardware devices on the PCI buses within the system is a key factor in the overall performance of the system. Accordingly, the present invention recognizes that configurations that prevent devices from operating at their maximum capability should be avoided. For example, careless placement of a hardware adapter (e.g., mismatching speeds by placing a 33 MHz hardware adapter on a 133 MHz bus or mixing modes by placing a conventional mode hardware adapter on a PCI-X mode bus) may result in significant performance degradation. A data processing system continues to function despite the less-than-optimum hardware component configuration, so problems with the configuration may only be evident during special circumstances (e.g., intervals of peak demand of the data processing system resources).

System administrators have attempted to solve this problem by looking at performance monitors and conceptualizing the system in their head and adjusting the PCI slot configuration based upon guesses and experience. It was then necessary to monitor the system(s) changes to see if they produced a gain in performance. To successfully detect bottlenecks and solve performance problems, system administrators must have many years of performance analysis experience. Even then, this approach is not reliable.

Simulation programs have solved this problem by containing a model of the system and sometimes the entire network. This requires a large amount of information to be input from the network and from the user. Simulation programs are larger and more complex and hence much more expensive. Simulation programs are also less accurate because the information utilized in the simulation usually cannot be kept up-to-date to accurately reflect the precise operational characteristics of the target system.

Active monitor methods have solved this problem by intentionally inducing performance problems in the network in order to determine performance characteristics. The active monitors that simulate the performance problems may not accurately represent what the applications will do on the network under actual operating conditions. Active monitors also interfere with other traffic in the network and are therefore not appropriate for use at all times.

Commonly owned U.S. patent application Ser. No. 09/253,413 (now U.S. Pat. No. 6,334,168). "System and Method for Monitoring and Analyzing Computer System Performance and Making Recommendations For Improving It," filed on Feb. 19, 1999, henceforth called Bottleneck Detection, uses an automated method of detecting and diagnosing computer system bottlenecks by utilizing passive monitoring techniques. This method identifies individual components causing bottlenecks and combinations of constrained component types and suggests a remedy. The recommended solution is usually to improve performance by adding to the capabilities of the bottlenecked component(s). However, this technique focused on addition of new components and did not recommend reconfiguration changes to the existing system.

Commonly owned U.S. patent application Ser. No. 09/918,330 (still pending), "System and Method for Identifying One or More Optimum Configurations of a Data Processing System" invention, filed on Jul. 30, 2001, deals with computer systems having PCI buses and is henceforth called PCI Optimization. That application relates to a system which examines PCI adapter configuration and, where possible, recommends an optimal PCI configuration based solely upon the electrical characteristics of the system and the installed adapters. The system of the PCI Optimization application attempts to find alternate configurations that provide the best match of slot and adapter electrical characteristics that are realizable on the PCI bus with the least effort on the part of the system administrator.

There is, however, a need to determine runtime effects that also influence optimal placement of adapters. For example, the PCI Optimization techniques may recommend placing two electrically similar but very busy adapters on a same PCI bus segment. Yet moving one of these adapters to an alternative slot on another PCI bus segment might provide better performance.

SUMMARY OF THE INVENTION

It is an object of the present invention to monitor and analyze computer or data processing system performance based on observed time performance measures.

It is a further object of the present invention to identify components of a data processing system operating under a constrained or bottleneck condition in a manner incompatible with an optimum data processing system configuration.

To overcome the foregoing and additional limitations of the prior art, the present invention provides an improved system and method of analyzing data processing system performance and identifying optimum configurations for the system based on observed constraints or bottlenecks and the time that such constraints occur. The data processing system to implement a preferred embodiment of the present invention includes a system analyzer/optimizer stored in a memory and executable by a processor.

In operation, the system analyzer/optimizer determines whether one or more is components of the system is operating in a present configuration under constraints and the times that the constraints occur. For those components determined to be operating under constraints, the system analyzer/optimizer determines if any constraints occur at common times with other components. If there are such occurrences, the system analyzer/optimizer generates alternate proposed configurations to the present configuration of the data processing system.

Optimal performance occurs when all adapters are plugged into slots that best match the electrical capabilities of each adapter and when all adapters experiencing simultaneous high bus utilization are isolated to different segments and where possible installed on the same bus segment as less busy adapters.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIGS. 6A, 6B, and 6C are views of example performance analysis recommendations displays formed according to the present invention; and FIGS. 7A, 7B and 7C are views of example performance analysis details displays formed according to the present invention.

DETAILED DESCRIPTION OF THE PREFERRED EMBODIMENT

Figure 1:
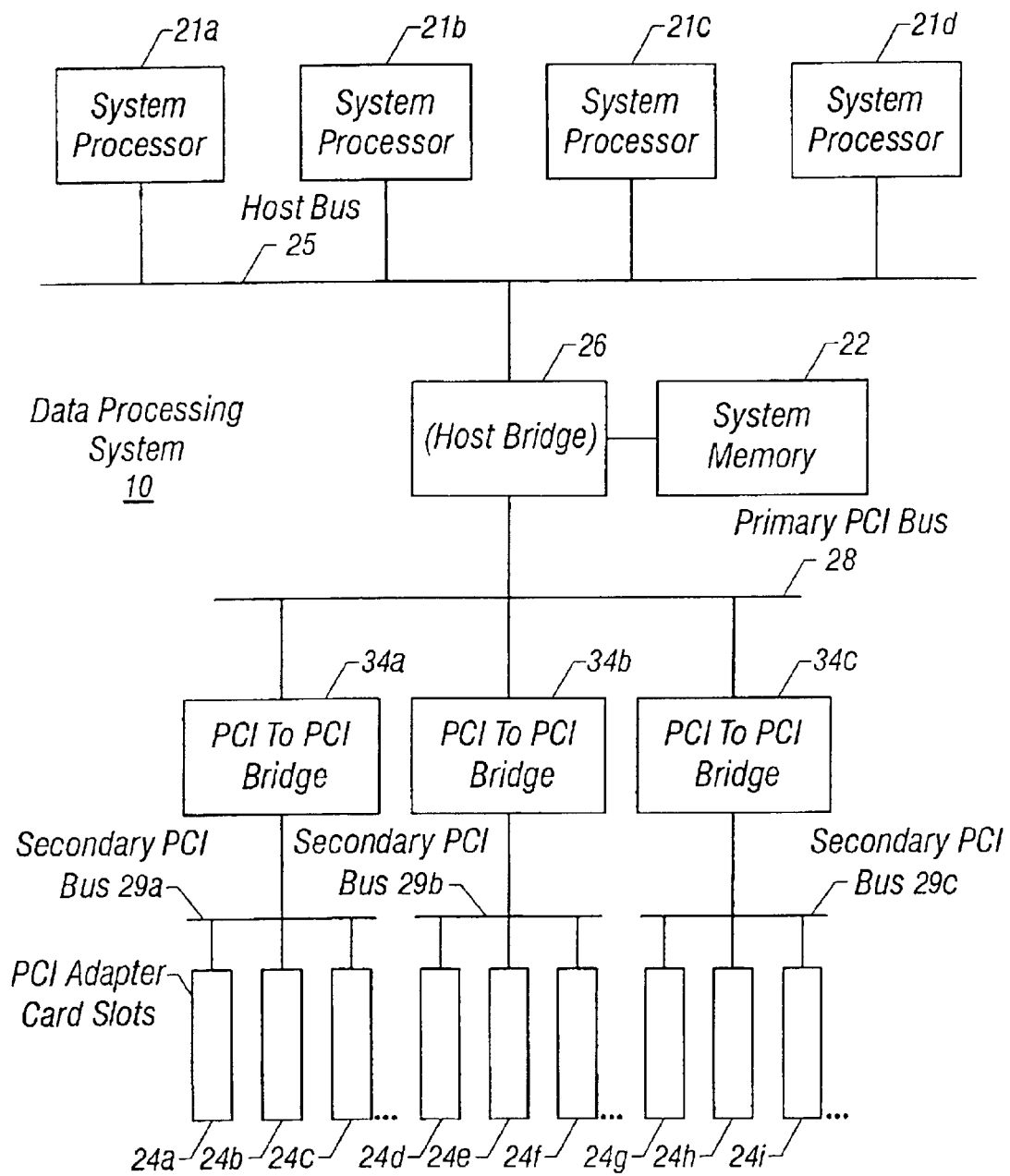
FIG. 1 depicts a block diagram of a data processing system which may be utilized to implement the present invention.

With reference now to the figures, and in particular, with reference to FIG. 1, there is depicted a block diagram of an exemplary data processing system 10 in which a preferred embodiment of the present invention may be implemented. As illustrated, data processing system 10 includes one or more system processor(s) 21a–21d and input/output (I/O) host bridge 26, herein referred to as "host bridge 26," coupled by a first interconnect (host bus) 25. System processor(s) 21a–21d, implemented as any generation of Pentium™ processor available from Intel Corporation in Santa Clara, Calif., are coupled to host bus 25 and execute software instructions to control the operation of data processing system 10. Host bridge 26 couples system memory 22 and a primary peripheral component interconnect (PCI) bus 28 to both host bus 25 and system processor(s) 21a–21d. System memory 22, coupled to host bridge 26 and provides storage for software and data, may include both read-only memory (ROM) and random access memory (RAM).

Coupling secondary PCI buses 29a–29c to primary PCI bus 8 are PCI-to-PCI bridges 34a–34c. Each of secondary PCI buses 29a–29c and primary PCI bus 28 (sometimes referred to as "bus segments") are electrically isolated from each other by host bridge 26 and PCI-to-PCI bridges 34a–34c. PCI hardware adapter slots 24a–24i are electrical connectors for coupling PCI hardware adapters to data processing system 10. Once inserted and powered, PCI hardware adapters became an integral part of data processing system 10 and are controllable by system processor(s) 21a–21d by relaying PCI bus transactions along the path formed by PCI hardware adapter slots 24a–24i, PCI-to-PCI bridges 34a–34c, primary PCI bus 28, host bridge 26, and host bus 25. Some system configurations do not utilize PCI-to-PCI bridges 34a–34c, and configure PCI hardware adapter slots 24a–24i on primary PCI bus 28. Other system configurations may employ more than three PCI hardware adapter slots on each secondary PCI bus.

Other elements of a data processing system, such as direct access storage devices (DASD), network I/O controllers, video controllers, and others may be implemented as different PCI hardware adapters coupled to PCI hardware adapter slots 24a–24i. Other elements may be implemented as hardware components soldered to a main system circuit board.

Figure 2:
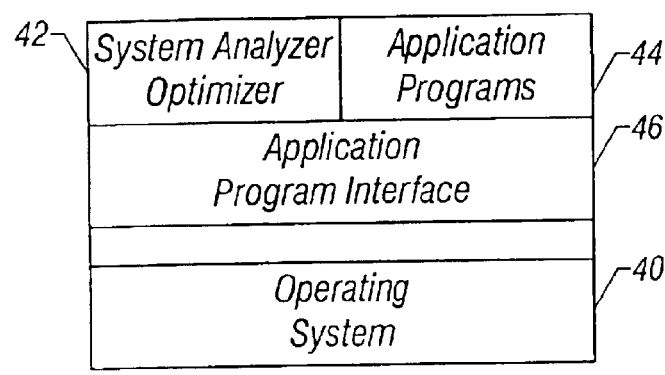
FIG. 2 illustrates a layer diagram of software, including a system analyzer/optimizer, utilized to implement a preferred embodiment of the present invention.

Referring now to FIG. 2, a software layer diagram of the software configuration of data processing system 10 is illustrated. As well-known in the art, a data processing system requires a set of program instructions, known as an operating system, to function properly. Basic functions (e.g., saving data to a memory device or controlling the input and output of data by the user) are handled by operating system 40, which may be at least partially stored in system memory 22 of data processing system 10. Application programs 44 for user functions (e.g., e-mail programs, word processors, Internet browsers), runs on top of operating system 40. System analyzer/optimizer 42, stored within system memory 22 and executable by system processor(s) 21a–21d, analyzes the current configuration of data processing system 10 and determines whether or not the current configuration is an optimized configuration. If the current configuration is not optimized, system analyzer/optimizer 42 generates and presents to a user at least one alternate optimized configuration.

As shown, system analyzer/optimizer 42 and application programs 44 access the functionality of operating system 40 via an application program interface 46 in one preferred embodiment of the present invention. In an alternative embodiment of the present invention, system analyzer/optimizer 42 may also be implemented as part of operating system 40.

Figure 3:
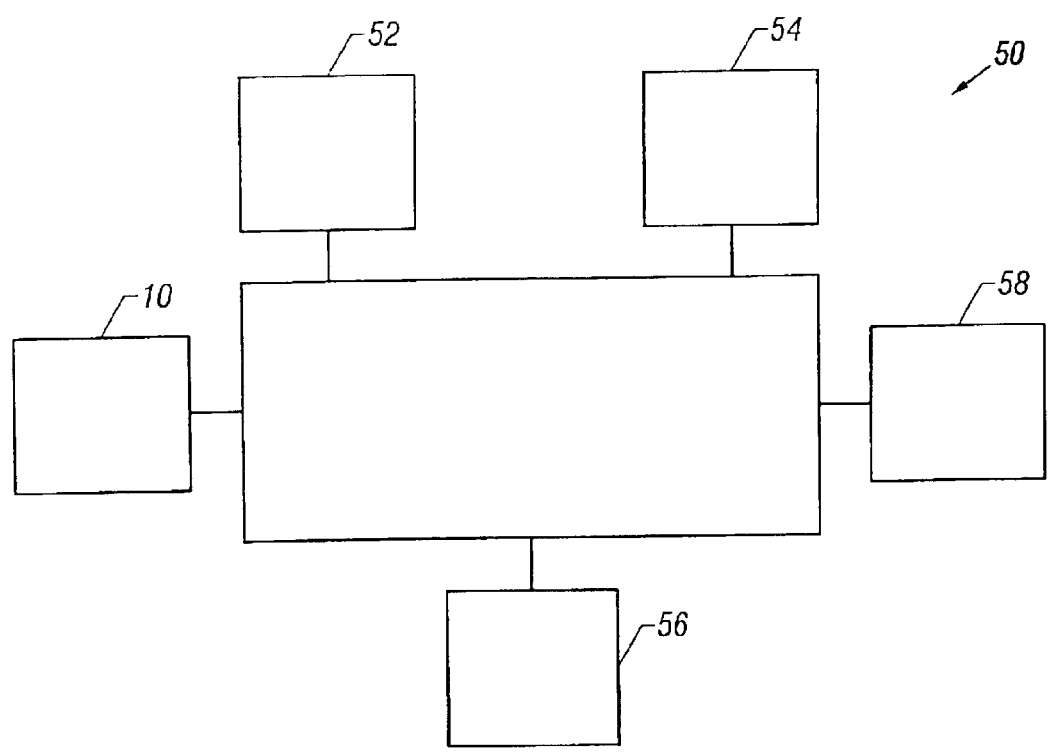
FIG. 3 depicts a block diagram of a computer network of the type used with the present invention.

FIG. 3 is a block diagram of a data transmission network 50 (sometimes simply referred to as a network) of the type which may be used with the present invention. The data transmission network 50 includes computer system 10 of FIG. 1 as well as other components 52, 54, 56 and 58. These components could be other computer systems, servers, printers or other computer apparatus. Although FIG. 3 depicts a network 50 of five devices, in actuality the network may include a variable number of components, from a small number, such as one or two, to a very large number, such as thousands.

Referring to FIGS. 1 and 3, a user of a computer system 10 may wish to view the performance of the network 50 on a display operating in conjunction with one of the processors 21a–21d. The performance of the network 50 may be of interest or concern to a network administrator, for example, in managing the performance of the network 50. Applications which reside on the user's system allow a query of the systems attached to network 50 to receive performance data on the system. This performance data, which are typically referred to as monitors, are time-varying information on the activity sensed at some point in the network, and may be an indication of the use of a resource, either in absolute amount (such as messages transmitted) or in relative terms (the portion of the memory which is used).

Figure 4:
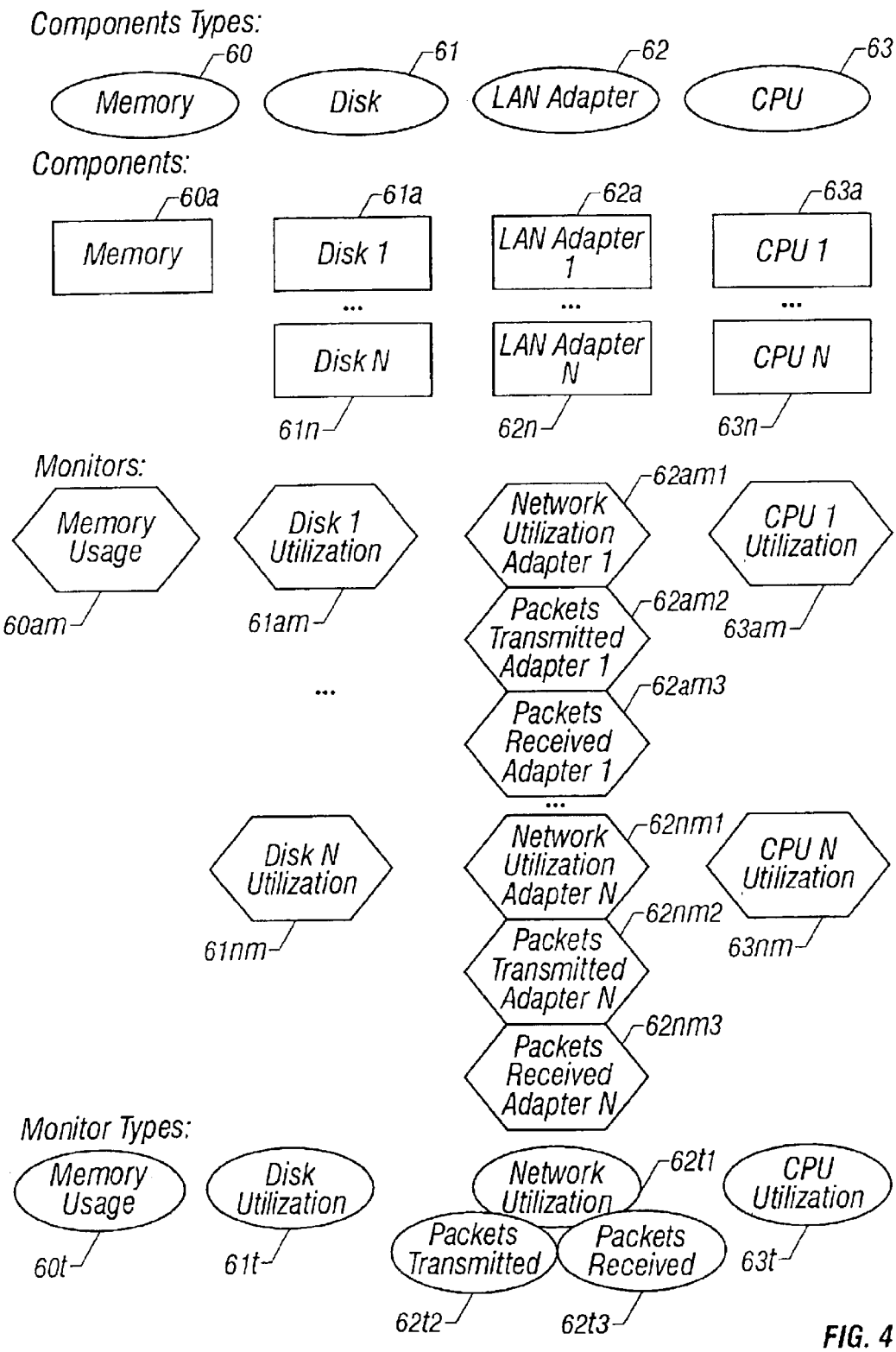
FIG. 4 is an illustration of monitors and monitor types which may be is used in the present invention for a system which includes the components and component types shown.

FIG. 4 is an illustration of the component types which may be present in a computer system or network of the type illustrated in FIG. 3, which may include individual servers, networks and other components such a printers. The component types include memory 60, disk(s) 61, LAN adapter(s) 62, and central processor units(s) or CPU 63. The memory type 60 is shown in a single memory 60a, with the disk 60 consisting of disk 1 (61a) through disk n (61n). The LAN adapter 62 includes LAN adapter 1 (62a) through LAN adapter n (62n) and the CPU is shown with CPU 1 (63a) through CPU n (63n). Associated with each of the components is at least one monitor, with the added subscript "m" added to designate the monitor associated with a given device, e.g., the monitor for memory usage 60am is associated with the memory 60a. Since there are several monitors for the LAN adapter 62a, these are indicated as a first monitor—utilization (62am1) through a third monitor—packets received—(62am3). The monitors can be grouped into types, such as memory usage 60t, disk utilization 61t, etc., corresponding to the respective monitors. The monitor types for the network can include network utilization 62t1, packets transmitted 62t2 and packets received 62t3. CPU utilization 63t is the type of monitor associated with the CPU monitor.

When a server's performance diminishes, it is usually one or more of the server's components are over-utilized or "constrained." For example:

(a) The memory may be constrained;

(b) One or more of the disks may be constrained;

(c) One or more of the LAN adapters may be constrained;

(d) One or more of the CPU's may be constrained;

(e) Some combination of the above may be true, e.g. the LAN and CPU may both be constrained; or (f) Multiple bandwidth constrained disk or LAN adapters are installed in the same bus segment when other bus segments and slots are available that would result in a configuration without multiple bandwidth constrained adapters on the same bus segment.

The preferred embodiment focuses on a situation of multiple disk or LAN adapters which are bandwidth constrained and installed in the same bus segment when other bus segments and slots are available, as discussed above. As will be set forth, the present invention optimizes system performance by combining knowledge of PCI component usage as a function of time with the electrical requirements of PCI components to recommend an optimal PCI configuration. In the disclosed embodiment, PCI components of this type take the form of LAN and DISK RAID adapters because these adapters have readily available performance counters and have well understood behavior. However, it is evident to those in the art that additional PCI components could be implemented according to the present invention and the procedures described herein.

As shown in FIG. 4, one or more "monitors" are provided for each component. The monitors are either given units of percents or can be converted to percentages of some maximum value. The monitors have the following characteristics:

The disks $61a$ through $61n$ each have a monitor called Disk Utilization, which is given in percents with zero percent being the lowest and 100% being the greatest representation of disk utilization.

The LAN Adapters $62a$ through $62n$ each have three monitors: Packets Transmitted, Packets Received, and Network Utilization. While Network Utilization is given in percents, the Packet monitors are converted into the percentage of an observed maximum. All monitors are recorded as a function of time.

As disclosed in the Bottleneck Detection Patent Application, experiments have shown that a component's response time begins to increase at an undesirable rate when its utilization reaches a threshold value that is between 60% and 80%. With the present invention, a component is considered constrained or "hot" when a performance monitor averages over 75% for an established period, typically one of at least two hours. A component which meets this criterion noticeably degrades performance. With the present invention, it does not matter whether the monitor averages 76% or 100%, because a component is either constrained or it is not constrained. The present invention allows a user to adjust the threshold to a different value for different monitors, but it is preferred to leave the monitors at this 75% default setting.

Figure 5:
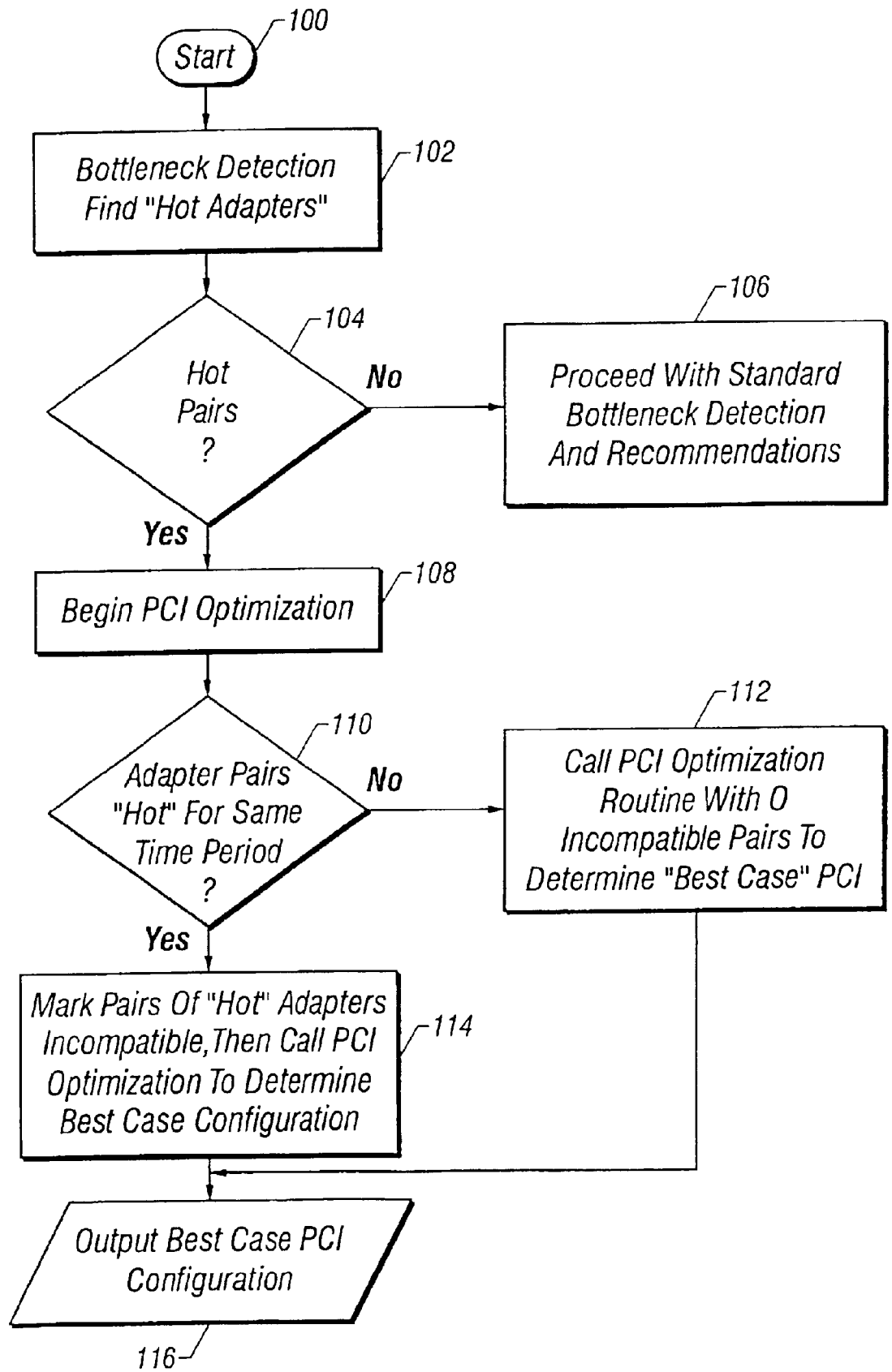
FIG. 5 is a high-level flowchart of detecting and diagnosing bottlenecks in a data processing system according to the present invention.

With reference to FIG. 5, there is depicted a high-level logic flowchart illustrating a method of detecting and diagnosing bottlenecks of a data processing system according to the present invention. Although the method referred to by FIG. 5 optimizes the configuration of adapters on a PCI interconnect, the method may apply to any hardware configuration of any interconnect. The method of detecting and diagnosing bottlenecks of a data processing system can be implemented utilizing the system analyzer/optimizer 42 stored in memory 22 and executable by system processor(s) $21a$–$21d$ of data processing system 10.

In the method depicted in FIG. 5, the process of the present invention begins at block 100, and continues at block 102 which depicts a procedure of bottleneck detection according to the previously referenced Bottleneck Detection Patent Application to determine whether or not any of the adapters are in a constrained bottleneck or "hot" condition, as defined in that patent application.

For the present invention, adapters that have been identified as having a bottleneck as described in above-identified Bottleneck Detection Patent Application are called "hot" adapters. Each "hot" adapter also has associated periods of time as indicated by its monitors that identify when the adapter was identified as "hot."

Next, during block 104, a determination is made as to whether or not there are two or more adapters "hot." If not, block 106 next occurs and bottleneck detection and provision of recommendations based on the results of such detection takes place in the manner described in the previously mentioned Bottleneck Detection Patent Application.

If during block 104 two or more "hot" adapters are detected for the same period of time on the same bus segment, block 108 is next performed. During block 108, optimization of the system configuration is begun according to the techniques of the previously mentioned PCI Optimization Patent Application. Next, during block 110 a determination is made whether the adapters identified as "hot" for the same period of time.

If not, block 112 next occurs and the PCI Optimization routines of the aforementioned PCI Optimization Patent Application are called with zero incompatible pairs specified to determine a best case PCI configuration. If no adapters are identified as being "hot" at the same time, then the PCI Optimization process may be applied without consideration of "hot" adapters, producing a set of recommendations that optimize electrical characteristics and may result in improved performance.

If during block 110 the results indicate an affirmative answer, a block 114 next occurs. The adapters identified as "hot" are marked as incompatible and processing begins according to the PCI Optimization Patent Application to determine a best case system configuration.

In doing so, the PCI Optimization techniques investigate whether there are combinations of slots available that would allow for a configuration that produces the following results:

Each "hot" adapter should be installed on a bus segment where it is the only "hot" adapter for the period of time the adapter was identified as "hot."

If a unique bus segment is not available for each "hot" adapter for the period of time that the adapters were identified as "hot," then a configuration should be recommended which produces the least time that two or more adapters are "hot" on the same bus.

In other words, the present invention measures the length of time that each adapter is hot while another adapter on the same bus is hot, and sums these times across all adapters to rank the possible reconfigurations.

When the above conditions are met, the present invention suggests a more optimal PCI adapter configuration. The preferred embodiment therefore identifies adapter cards that are "hot" simultaneously by scanning multiple monitors across the domain of time and recommending a more optimal configuration when one is possible.

Using "hot" cards only, additional methods disclosed here perform an analysis of the time-variant usage patterns of the "hot" cards to detect period of time during which a plurality of adapters cards are "hot" simultaneously. All simultaneously hot adapters are declared to be "incompatible pairs." Note that the incompatibilities are not transitive nature (i.e., if card A is incompatible with card B and card B is incompatible with card C, it is not necessarily true that card A is incompatible with card C). Therefore all pairings of incompatible cards must be identified and noted. The incompatible pairs are ranked according to the combined durations of the times that they are incompatible.

The PCI Optimization method then incorporates an additional rule, which is that a configuration is not optimum if any incompatible pair of adapters reside on the same bus. If there is no possible configuration that meets the additional rule, then the incompatible pairs that were simultaneously hot for the least time are discarded to find the best solution.

The present invention also imposes during the Optimization processing certain additional rules limiting the types of reconfiguration which are recommended. Examples of the rules so imposed include the following:

A reconfiguration is not recommended that would require a "hot" PCI adapter to run in a slot with a slower clock speed or narrower data bus width than the current configuration provides.

Low-use adapters are migrated to slower/narrower buses and their performance perhaps sacrificed to make room for "hot" adapters whenever this would allow two such adapters to be installed into different bus segments. Consider in this regard the following example: A system with three buses and three hot 66 MHz adapters plus an additional adapter or adapters of a faster speed, such as 133 MHz. Placing all of the hot 66 MHz adapters on two buses allows the remaining bus to be used by the "low-use" 133 MHz adapter at its full rated speed. However, it also compromises the performance of the slower speed but busier 66 MHz adapters. Spreading the hot adapters over all three buses to separate them would result in the 133 MHz adapter having to run at 66 MHz. But this choice would usually make more sense, since it is the utilization of the "hot" adapters that will determine the overall throughput of the system.

The PCI Optimization method incorporates requisite changes related to the expansion of the spanned tree and determines the specific sequence of steps necessary to convert a starting configuration into a desired configuration. Specifically, the original slot position of incompatible adapters must be tracked as the adapters are moved and swapped during expansion of the tree. This requires recognition of the fact that a 133 MHz PCI-X adapter from a slot that was originally part of an incompatible pair is not equivalent to any other 133 MHz PCI-X adapters. Likewise, when instructing the user on how to change the configuration it is not adequate to move any 133 MHz PCI-X adapter into a slot that requires a 133 MHz PCI-X adapter in the desired configuration (because of the potential incompatibility between "hot" adapters that may arise). Electrically compatible 133 MHz PCI-X adapters that could be configured on the same PCI bus segment may be "hot" for the same period of time. Installing these "hot" pairs of adapters into the same bus segment would result in less than optimal performance. A more optimal solution is to identify "hot" pairs of adapters based upon actual usage. Based on this, it is then better to recommend a configuration so that "hot" pairs of adapters that are active for the same period of time are installed into different bus segments. Evenly distributing "hot" adapters across different PCI bus segments improves system I/O or input/output performance.

It is not desired to track the original slot position of all other (i.e. compatible) cards, because the Optimization procedures work most efficiently if they are free to treat all cards with the same characteristics as being equivalent (and a difference in the original slot position would be a detectable difference if traced for those cards).

As a final portion of the procedure of FIG. 5, a block 116 is next in sequence after either of blocks 112 or 114. During block 116, displays are formed indicating the best case PCI configuration as determined by the PCI Optimization Patent Application.

FIGS. 6A, 6B, 6C, 7A, 7B and 7C are example output displays or reports from the present invention. Further details about the formation and organization of the displays, as well as their access, are contained in the above-identified Bottleneck Detection patent application which has been incorporated by reference. The example displays formed according to the present invention are of two general types: Recommendations, as shown in FIGS. 6A, 6B and 6C, and Details, as shown in FIGS. 7A, 7B and 7C.

The Recommendations of FIGS. 6A, 6B and 6C are abbreviated versions of the Details of FIGS. 7A, 7B and 7C, respectively. The Recommendations preferably contain only problems that a user most clearly needs to address. The text of the displays is in HTML format, although it should be understood that other formats may equally as well be used. The underlined phrases in the Recommendations displays of FIGS. 6A, 6B and 6C are hyperlinks. Clicking a computer pointer on the phrase "Go to details" portion of a Recommendations display takes the computer user to a corresponding of the related Details display. Clicking a computer pointer on the name of the monitors causes the system to generate a graph of monitor value versus time as described in the above-identified Bottleneck Detection U.S. patent application. The problems are listed in the displays of FIGS. 6A, 6B, 6C, 7A, 7B and 7C are arranged in their out put according to their relative severity. The systems are listed in the order of how often they experience bottlenecks. If a system should have multiple bottlenecks, then the bottlenecks are listed in order of their frequency of occurrence.

The performance analysis details sections shown as examples in FIGS. 7A, 7B and 7C inform a user of the duration or magnitude of the bottleneck. The data displayed can be used by a network administrator to prioritize a response to a particular bottleneck. In addition, the time that a bottleneck occurred is also indicated to provide the network administrator with information to decide whether the bottleneck was a result of a short-lived event or if it is likely to be a regular occurrence and thus one demanding more prompt or even immediate attention.

It should be noted that application of the PCI Optimization process by itself might produce a recommended configuration change that is substantially different from the recommendation made when an analysis of "hot" adapters is included. To avoid situations where a PCI Optimization recommendation is followed some time later by a different recommendation that includes "hot" adapters, the preferred embodiment incorporates the methods of PCI Optimization into the implementation of Bottleneck Detection. The preferred embodiment does not analyze the electrical characteristics of the system or make recommendations related to configuration changes until Bottleneck Detection has had sufficient time (for example, two hours, as noted above ) to collect the information that it needs to identify "hot" or incompatible adapters.

Similarly, a recommendation produced by the combined Optimization and Bottleneck Detection methods may be followed some time later by a different recommendation if the usage of the system has changed substantially and results in a different set of "hot" adapters. To avoid the appearance of inconsistency, the preferred embodiment makes a first recommendation to change the configuration only after a thorough understanding of the usage pattern is obtained and does not make a second recommendation until a substantial, programmed time interval (again, for example, two hours) has passed.

It should be noted that variations of the preferred embodiment described above may be used in certain situations to arrive at an optimized configuration. These variations may not, however, afford all of the advantages of the preferred embodiment for reasons given below, although the results achieved by these variations may be acceptable.

One alternative embodiment would operate by identifying a PCI card as "hot" or bottlenecked because it has sustained a high utilization average or one or more monitors without reference to the specific durations of "hot" times. However, it is possible for an adapter to have a high utilization monitor at one point in time and another adapter on the same bus segment that has a high utilization monitor for a different period of time. These adapters can normally coexist without resulting in degraded performance. An example would be LAN adapters that are paired on the same bus segment. One adapter is used for a backup process and runs a high utilization at night while the other LAN adapter is used to support a busy production network during the day. Simply optimizing the configuration because adapters were "hot" at some unspecified time would produce unneeded reconfiguration recommendations. The erroneous recommendation to separate these adapters might place constraints on the placement of other adapters and prevent a truly optimal configuration from being achieved.

Another alternative embodiment would identify a PCI card as "hot" because it had a bottleneck at any instant in time without using the technique described herein of a running average of "hot" time. This would not be as desirable as the preferred embodiment, because the alternative technique would lead to possible thrashing of the recommended PCI configuration. Simply identifying an adapter that has had a bottleneck at any instant in the past is insufficient grounds to recommend a PCI reconfiguration because it ignores the time domain. The preferred embodiment in contrast detects bottlenecks that occur for at least some specified time, such as several hours, before identifying an adapter as "hot." With the technique of the preferred embodiment, when two or more "hot" adapters are on the same bus segment and have been causing a bottleneck for several hours at a time, it is more likely that a reconfiguration will result in a noticeable improvement in performance. Furthermore, the technique of the preferred embodiment eliminates spurious recommendations that may result from short, infrequent bottlenecks that might regularly occur.

Still another alternative embodiment would identify a PCI adapter as "hot" because it had a bottleneck for a specified percentage of time. However, this technique would not be optimal because it does not take into account the specific period of time that a bottleneck occurred. As stated above, the specified time and duration of occurrence are required to identify incompatible "hot" cards because two cards could be "hot" for several hours but at different intervals and durations of time.

The flowchart of FIG. 5 can also be supplemented by making it possible to call the PCI optimization before information about "hot" adapters is generated. This might be done as a measure of verification just after physically configuring a system to determine if the optimal electrical configuration has been achieved. In this case the PCI Optimization process produces the most optimal PCI configuration as described in that application.

It should be understood that the present invention can also be used in other situations. For example, commonly owned, copending U.S. Patent Application, "System and Method for Predicting Computer System Performance and for Making Recommendations for Improving Its Performance", Ser. No. 09/283,362 (now abandoned) filed Mar. 31, 1999 teaches that bottlenecks can be remedied before they occur by forecasting them. The present invention can be used to process forecasted bottlenecks identified according to that application in the same way that it handles historical bottlenecks, as described above. If there are currently no incompatible pairs of adapters, a forecast of bottlenecks could determine if any pairs are expected to became incompatible in the fixture.

The present invention also improves the invention disclosed in commonly owned, copending U.S. Patent Application, "System and Method for Identifying Latent Computer System Bottlenecks and for Making Recommendations for Improving Computer System Performance", Ser. No. 09/255,955 (now U.S. Pat. No. 6,434,613), filed Feb. 23, 1999, which teaches that the latent bottlenecks are often realized when the existing bottlenecks are remedied. The present invention can consider latent bottlenecks observed according to that application in determining incompatible pairs of adapters, on the assumption that the realized bottlenecks can be remedied so the latent bottlenecks would then be realized.

The present invention also improves the invention disclosed in the Bottleneck Detection patent application. This is done by enhancing recommendations to add adapters to the system to relieve an existing bottleneck by suggesting a slot number into which the new adapter should be installed. This is achieved by the PCI Optimization process using a fictitious card with the proper characteristics (both electrical and utilization) installed into any open slot and then finding where the card should be moved for optimal performance. Proper characteristics of the new card come from "cloning" the bottlenecked card or from information available to the administrator. It is to be noted that the final recommendation in this case may not be as simple as just adding a card. In order to be truly optimized, other, existing adapters may need to be shuffled around.

From the foregoing, it can be seen that the present invention affords several advantages and improvements. It utilizes a systematic approach to bottleneck detection that eliminates errors resulting from misinterpretation of the performance counters and improper configuration of the PCI adapters. The present invention does not require the presence of a skilled system administrator for bottleneck detection, nor does it require a skilled systems analyst to recommend the appropriate system upgrade.

The present invention can also analyze more systems more quickly than a system administrator. The present invention can find problems that a human would miss, since the present invention looks at all data for all monitors at once. It is difficult for a person to analyze a large number of monitors together, and administrators might overlook combinations of constrained components.

The present invention offers predefined system performance thresholds to accurately define the occurrence of a bottleneck. Novice users may misinterpret the relationship between utilization and bottlenecks; for example, some expect to run a resource up to 100% before a bottleneck occurs. This detecting of bottleneck occurrence at a time derived from actual experience is a feature of the present invention.

Furthermore, when bottlenecks are found often a significant performance improvement is only possible by increasing the performance of the bottlenecked component. Usually this means replacing the adapter with a faster adapter or adding another adapter of the same type and shifting some of the workload from the bottlenecked adapter to the new adapter. For example, the solution might be to add an additional LAN or disk adapter to off-load a bottlenecked component. This invention also introduces a method to recommend the optimal slot into which the new adapter should be installed. This is done, as noted above, by the PCI Optimization patent application techniques using a fictitious card with the proper characteristics (both electrical and utilization) installed into any open slot and then finding where the card should be moved for optimal performance.

The present invention also provides an ability to improve system performance without the purchase of additional hardware by simply recommending a reorganization of PCI adapter configuration. The present invention in its implementation prioritizes its recommendation to move adapters based upon which adapters are easier to move. For example, LAN adapters typically have a single easy to remove cable while disk controllers often have multiple parallel cables that are more difficult to remove and more sensitive to insertion/reinsertion cycles. When the present invention determines that a component of a computer system, such as either a LAN or a disk adapter, must be moved, it prioritizes the recommendation to move the LAN adapter before a recommendation to move the disk controller. When the present invention recommends an additional disk controller or LAN adapter be added to the system to relieve a current bottleneck, the invention recommends the best PCI slot into which the card should be installed.

Various modifications of the disclosed embodiment, as well as alternative embodiments of the invention, will become apparent to persons skilled in the art upon reference to the description of the invention. It is therefore contemplated that such modification can be made without departing from the spirit or scope of the present invention as defined in the appended claims.

What is claimed is:

1. A method comprising:
    monitoring a first performance level of a first hardware component coupled to a first bus segment in a computer;
    monitoring a second performance level of a second hardware component coupled to the first bus segment in the computer; and
    in response to either the first or second hardware components exceeding a pre-determined utilization level due to an incompatibility between the first and second hardware components, dynamically reconfiguring the computer such that the second hardware component is physically de-coupled from the first bus segment, and wherein the second hardware component is subsequently physically coupled to a second bus segment that is electrically isolated from the first bus segment.

2. The method of claim 1, wherein the pre-determined utilization level is 75% of a maximum operating capability of a hardware component being evaluated.

3. The method of claim 2, wherein an evaluated component must exceed 75% of the maximum operating capability for at least two hours to exceed the pre-determined utilization level.

4. The method of claim 3, wherein the first hardware component is a disk adapter.

5. The method of claim 3, wherein the first hardware component is a Local Area Network (LAN) adapter.

6. The method of claim 3, wherein the first hardware component is a memory chip.

7. The method of claim 3, further comprising:
    monitoring a third performance level of a third hardware component coupled to a third bus segment in the computer;
    monitoring a fourth performance level of a fourth hardware component coupled to the third bus segment in the computer;
    summing a first total amount of time during a two-hour window that the third and fourth hardware components each exceed the pre-determined utilization level; and
    summing a second total amount of time during a two-hour window that the first and second hardware components each exceed the pre-determined utilization level; and
    in response to the first total amount of time being more than the second total amount of time, skipping the step of physically de-coupling the second hardware component from the first bus segment and physically moving the fourth hardware component from the third bus segment to either the first bus segment, that is electrically isolated from the third bus segment, or the second bus segment, that is electrically isolated from the third bus segment.

8. The method of claim 3, further comprising:
    waiting at least two hours before reconfiguring the computer in accordance with the steps described in claim 1.

9. The method of claim 1, wherein the first and second bus segments are secondary Peripheral Computer Interconnect (PCI) busses that are coupled to a primary PCI bus.

10. The method of claim 9, wherein each secondary PCI bus is coupled to a same primary PCI bus via a different PCI-to-PCI bridge.

11. The method of claim 1, wherein the incompatibility between the first and second hardware components is due to a difference in data throughput speeds in the first and second hardware components.

12. A computer program product, residing on a computer usable medium, comprising:
    computer program code for monitoring a first performance level of a first hardware component coupled to a first bus segment in a computer;
    computer program code for monitoring a second performance level of a second hardware component coupled to the first bus segment in the computer; and
    computer program code for, in response to either the first or second hardware components exceeding a pre-determined utilization level due to an incompatibility between the first and second hardware components, dynamically reconfiguring the computer such that the second hardware component is physically de-coupled from the first bus segment, and wherein the second hardware component is subsequently physically coupled to a second bus segment that is electrically isolated from the first bus segment.

13. The computer program product of claim 12, wherein the pre-determined utilization level is 75% of a maximum operating capability of a hardware component being evaluated.

14. The computer program product of claim 13, wherein an evaluated component must exceed 75% of the maximum operating capability for at least two hours to exceed the pre-determined utilization level.

15. The computer program product of claim 14, further comprising:
    computer program code for monitoring a third performance level of a third hardware component coupled to a third bus segment in the computer;
    computer program code for monitoring a fourth performance level of a fourth hardware component coupled to the third bus segment in the computer;
    computer program code for summing a first total amount of time during a two-hour window that the third and fourth hardware components each exceed the pre-determined utilization level;
    computer program code for summing a second total amount of time during a two-hour window that the first and second hardware components each exceed the pre-determined utilization level; and computer program code for, in response to the first total amount of time being more than the second total amount of time, skipping the step of physically do-coupling the second hardware component from the first bus segment and physically moving the fourth hardware component from the third bus segment to either the first bus segment, that is electrically isolated from the third bus segment, or the second bus segment, that is electrically isolated from the third bus segment.

16. The computer program product of claim 14, further comprising:

computer program code for waiting at least two hours before reconfiguring the computer in accordance with the steps described in claim 1.

17. The computer program product of claim 13, wherein the first hardware component is a memory chip.

18. The computer program product of claim 12, wherein the first and second bus segments are secondary Peripheral Computer Interconnect (PCI) busses that are coupled to a primary PCI bus.

19. The computer program product of claim 18, wherein each secondary PCI bus is coupled to a same primary PCI bus via a different PCI-to-PCI bridge.

20. The computer program product of claim 12, wherein the incompatibility between the first and second hardware components is duo to a difference in data throughput speeds in the first and second hardware components.

* * * * *

UNITED STATES PATENT AND TRADEMARK OFFICE
CERTIFICATE OF CORRECTION

PATENT NO. : 6,961,794 B2 Page 1 of 1
APPLICATION NO. : 09/957912
DATED : November 1, 2005
INVENTOR(S) : Atherton et al.

It is certified that error appears in the above-identified patent and that said Letters Patent is hereby corrected as shown below:

column 4, line 13, between "more" and "components" delete "is".

column 4, line 48, between "be" and "used" delete "is".

column 16, line 12, delete "duo" and insert --due--.

Signed and Sealed this

Twenty-eighth Day of November, 2006

JON W. DUDAS
*Director of the United States Patent and Trademark Office*